United States Patent
Narita

(10) Patent No.: US 8,028,321 B2
(45) Date of Patent: Sep. 27, 2011

(54) BROADCAST SIGNAL RECEIVING APPARATUS

(75) Inventor: Shusuke Narita, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 590 days.

(21) Appl. No.: 12/137,163

(22) Filed: Jun. 11, 2008

(65) Prior Publication Data

US 2008/0313695 A1    Dec. 18, 2008

(30) Foreign Application Priority Data

Jun. 12, 2007    (JP) .................................. 2007-155427

(51) Int. Cl.
*H04N 7/173* (2006.01)

(52) U.S. Cl. .............................. 725/131; 725/50; 725/56

(58) Field of Classification Search .................. 725/131, 725/50, 56
See application file for complete search history.

(56) References Cited

U.S. PATENT DOCUMENTS

| | | | |
|---|---|---|---|
| 6,137,546 A * | 10/2000 | Shintani et al. | 348/731 |
| 7,375,771 B2 | 5/2008 | Naoi et al. | |
| 2004/0207764 A1 * | 10/2004 | Naoi et al. | 348/732 |
| 2005/0289609 A1 * | 12/2005 | Takagi et al. | 725/72 |
| 2006/0048181 A1 * | 3/2006 | Kim et al. | 725/37 |
| 2006/0090191 A1 * | 4/2006 | Takagi | 725/153 |
| 2006/0117353 A1 * | 6/2006 | Narita et al. | 725/72 |

FOREIGN PATENT DOCUMENTS

| | | |
|---|---|---|
| JP | 2000-101984 A | 4/2000 |
| JP | 2004-320397 A | 11/2004 |

* cited by examiner

*Primary Examiner* — Pankaj Kumar
*Assistant Examiner* — Mulugeta Mengesha
(74) *Attorney, Agent, or Firm* — Crowell & Moring LLP

(57) ABSTRACT

A broadcast signal receiving apparatus 1 can display channel map information of receivable channels on a screen of a monitor display apparatus when a user desires. The broadcast signal receiving apparatus 1 comprises a channel map information updater (primary controller) 8 that updates the channel map information regularly. The channel map information includes a deletion counter for each channel registered in the channel map information which is used to judge whether channel information of the channel is deleted from the channel map information or not. The channel map information updater 8 increases a value of deletion counter of a channel by one when broadcast signal of the channel cannot be received, resets a value of deletion counter of a channel when broadcast signal of the channel can be received in each updating of the channel map information, and deletes channel information of a channel from the channel map information when the value of deletion counter of the channel reaches to a threshold.

4 Claims, 4 Drawing Sheets

BROADCAST SIGNAL RECEIVING APPARATUS

BACKGROUND OF THE INVENTION

1. Field of the Invention

The present invention relates to a broadcast signal receiving apparatus that receives video signals and audio signals included in broadcast signal and outputs them to a monitor display apparatus, for example.

2. Description of the Related Art

Conventionally, a broadcast signal receiving apparatus stores information relating to receivable channels as channel map information for convenience of a user. In particular, a broadcast signal receiving apparatus shown in JP 2004-320397 A, for example, judges whether broadcast signal is receivable or not with respect to channels other than channels which have been registered in a previous initialization of channels, and adds channel information of channels that the broadcast signal can be received into the channel map.

However, when broadcast signal of a channel among the channels initially registered cannot be received due to close-down, for example, information of the channel remains in the channel map, so that it damages the convenience.

SUMMARY OF THE INVENTION

The present invention is conceived to solve the above mentioned conventional problem, and aimed to provide a broadcast signal receiving apparatus which enables to update the channel map corresponding to delivery of broadcast signals and to display the updated channel map, arbitrarily.

A broadcast signal receiving apparatus in accordance with an aspect of the present invention comprises:

a video and audio signal receiver that receives video signals and audio signals included in broadcast signal;

a control signal receiver that receives broadcast control signal included in the broadcast signal;

a control signal processor that processes the broadcast control signal;

a channel map information creature that creates channel map information including information of channels, broadcast signals of which are receivable based on signals processed by the control signal processor;

a memory that stores the channel map information; and a channel map information updater that updates the channel map information regularly, wherein the channel map information includes a deletion counter for each channel registered in the channel map information which is used to judge whether channel information of the channel is deleted from the channel map information or not;

the channel map information updater increases a value of deletion counter of a channel by one when broadcast signal of the channel cannot be received, and resets a value of deletion counter of a channel when broadcast signal of the channel can be received in each updating of the channel map information; and the channel map information updater deletes channel information of a channel from the channel map information when the value of deletion counter of the channel reaches to a threshold.

According to such a configuration, when the channel map updater performs updating of the channel map information, the channel information of the channel that the value of deletion counter reaches to the predetermined threshold is deleted from the channel map information stored in the memory. Thus, when the channel map information is displayed on the monitor display apparatus, the channel information of the channel which is not delivered may not be displayed. In other words, the user can obtain only the channel information of receivable channels, so that channel selection can be performed smoothly without bothersome of unusable or unnecessary information, and thus, usability of the broadcast signal receiving apparatus can be increased.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DETAILED DESCRIPTION OF THE EMBODIMENT

Figure 1:
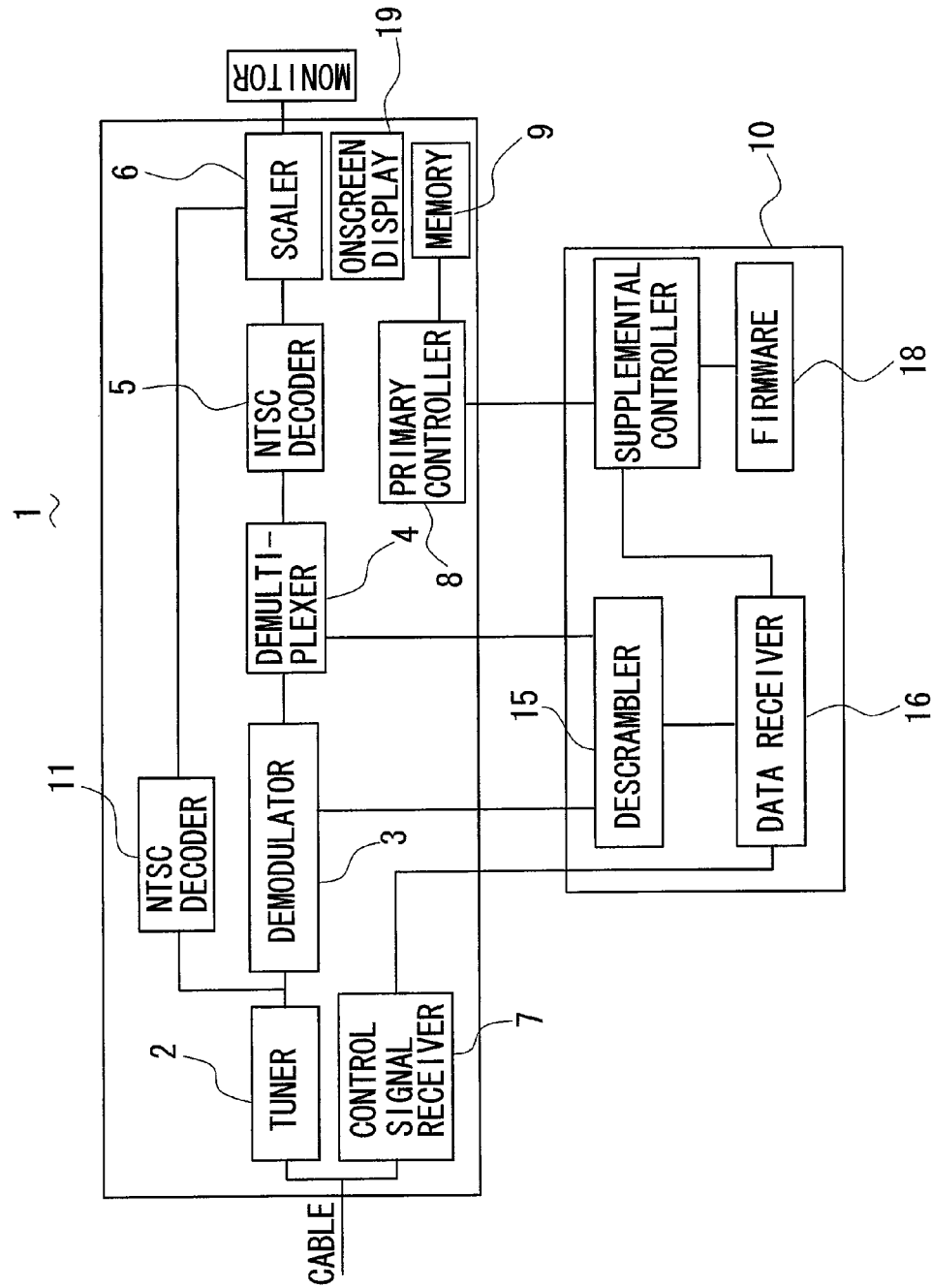
FIG. 1 is a block diagram showing a configuration of a broadcast signal receiving apparatus in accordance with an embodiment of the present invention.

A broadcast signal receiving apparatus in accordance with an embodiment of the present invention is described with reference to the figures. FIG. 1 shows a block configuration of the broadcast signal receiving apparatus 1 that receives television broadcast signals delivered through a cable, for example.

The broadcast signal receiving apparatus 1 comprises the following elements. A tuner 2 tunes broadcast signal of a channel that the user selects, and receives video signals and audio signals included in the broadcast signal. A demodulator 3 demodulates the broadcast signal outputted from the tuner 2 to digital data of MPEG-TS. A demultiplexer 4 takes out data of the channel that the user selects among the multiplexed digital data of MPEG-TS. A MPEG decoder 5 decodes the digital data of MPEG-TS to video signals. A scaler 6 converts image size of the video signals outputted from the MPEG decoder 5 corresponding to an output device of a monitor display apparatus and outputs the converted video signals to the monitor display apparatus. A control signal receiver 7 receives broadcast control signal included in the broadcast signal transmitted from a local provider of a cable cast, and decodes the broadcast control signal. A primary controller 8 is configured of a CPU and so on, and controls the above mentioned elements. A memory 9 stores information processed in the controller. A control signal processor 10 is formed as a card shape and inserted into a slot provided on a main frame of the broadcast signal receiving apparatus 1. The control signal processor 10 processes the broadcast control signal received by the control signal receiver 7.

The broadcast signal receiving apparatus 1 accepts both of digital broadcasting and analogue broadcasting, for example, so that it comprises an NTSC decoder 11 that decodes analogous broadcast signals (NTSC) to video signals.

The control signal processor 10 is a card shaped signal processing device called "cable card" and loaned to a used by a cable television provider who contracts with the provider. The control signal processor 10 comprises a descrambler 15 that descrambles the broadcast signal such as pay-TV or pay-cable among the broadcast signals demodulated by the demodulator 3, a data receiver 16 that transmits the broadcast control signal outputted from the control signal receiver 7 to the descrambler 15 and a supplemental controller 17 which controls each element of the control signal processor 10, and a firmware 18 of the supplemental controller 17.

In addition, an on-screen displayer 19 is further provided to display a channel map information on except a value of deletion counter of each receivable channel on a screen of a monitor display apparatus, when a user desires. Details of the channel map information will be described later.

When the control signal processor 10 is attached to the main frame of the broadcast signal receiving apparatus 1, the descrambler 15 is activated, so that digital broadcast signals can be processed sequentially by the tuner 2, demodulator 3, descrambler 15, demultiplexer 4, MPEG decoder 5 and scaler 6 and outputted to the monitor display apparatus. On the other hand, a broadcast control signal including information relating to receivable channels is processed sequentially by the control signal receiver 7, data receiver 16, supplemental controller 17, and primary controller 8.

The primary controller 8 serves as a channel map creator that crates channel map information based on information relating to receivable channels outputted from the supplemental controller 17, and stores the channel map information into the memory 9. The primary controller 8 displays a channel map on a screen of the monitor display apparatus with using the channel map information stored in the memory 9 corresponding to request by the user. In addition, the primary controller 8 serving as a channel map creator further includes channel map updating function, that is, the primary controller 8 serves as a channel map updater.

Since the broadcast control signals are delivered from TV stations regularly at interval of several tens seconds, for example, the primary controller 8 updates the channel map information whenever the broadcast signal receiver 7 receives the broadcast control signal. At the present time, analogue broadcasting and digital broadcasting coexist, so that the same programs which are different the modulation systems such as NTSC of analogue broadcasting and 64 QAM and 256 QAM of digital broadcasting are delivered simultaneously.

Figure 2:
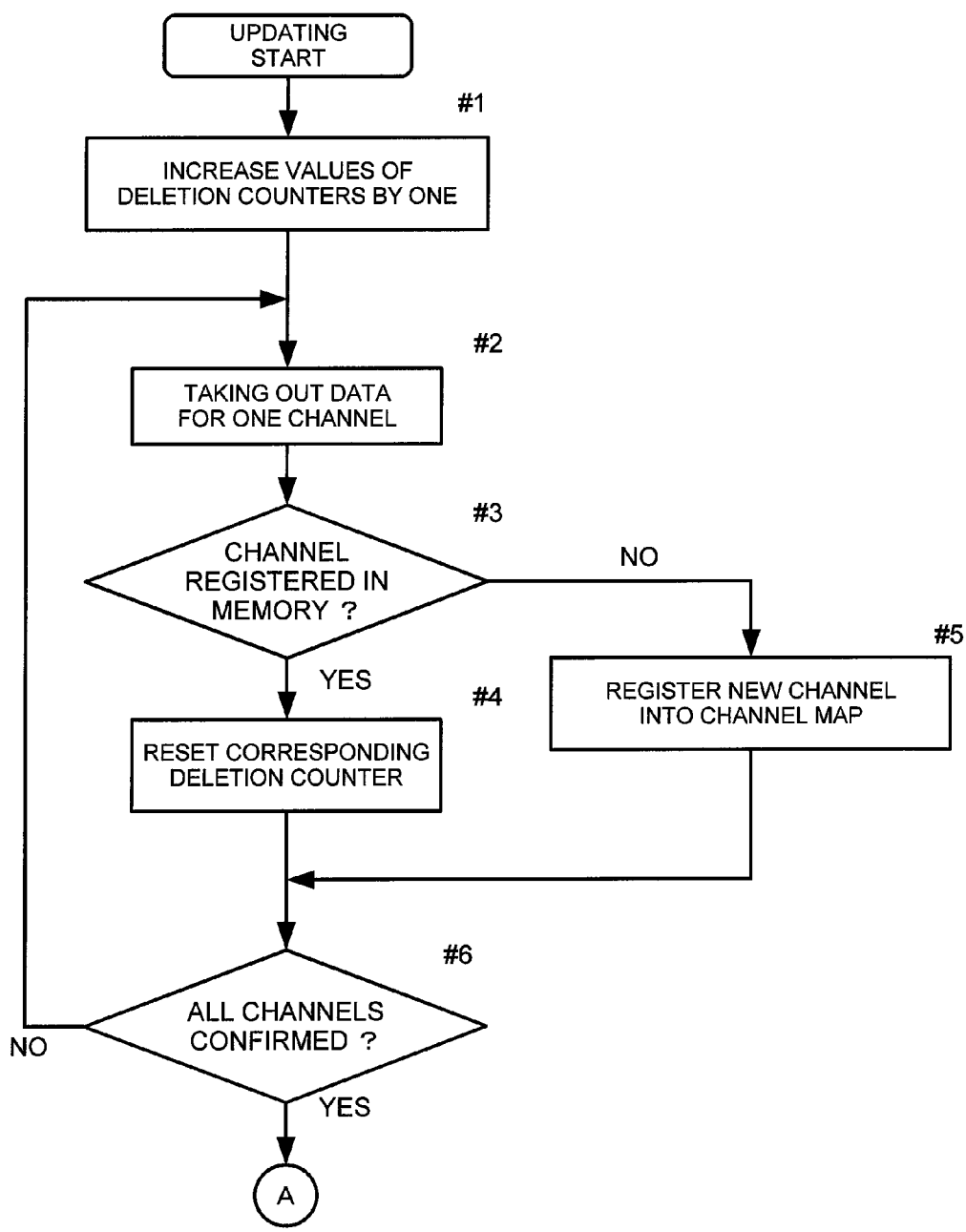
FIG. 2 is a flowchart showing processes performed by a channel map creature in update of channel map information.

Subsequently, updating process of the channel map information by the primary controller 8 serving as the channel map updater is described with reference to FIGS. 2, 3 and 4.

When starting the updating of the channel map information, the primary controller 8 increases a value of a deletion counter by one with respect to each channel registered in the channel map information (step #1), initially. Subsequently, the control signal receiver 7 tries to receive broadcast signal of each channel sequentially changing tuning frequency of channel, for example. The primary controller 8 serving as the channel map information updater judges whether broadcast signal of each channel is receivable or not based on the control signal included in the broadcast signal of each channel, and takes out a data for one channel (hereinafter, abbreviated as channel information) among the information relating to obtained channels (step #2). Hereupon, the obtained channels are the channels that broadcast signals thereof can be received by the control signal receiver 7 and the tuner 2.

When the channel of the data taken out by the primary controller 8 has been registered in the memory 9 (YES in step #3), the primary controller 8 resets the value of the deletion counter of the channel to "0" (step #4), and proceeds to step #6. Alternatively when the channel of the data taken out by the primary controller 8 has not been registered in the memory 9 (NO in step #3), the primary controller 8 resets the value of the deletion counter of the channel to "0", registers the channel information into the channel map information stored in the memory 9 (step #5), and proceeds to step #6. In step 6, the above mentioned steps #2 to #5 are repeated with respect to all of the obtained channels (NO in step #6).

When the steps #2 to #5 are repeated for all of the obtained channels, that is, confirmed whether the channel has been registered or not is completed for all the obtained channels (YES in step #6), the primary controller 8 takes out channel information of one channel among the channel map information stored in the memory 9 (#7), and compares the value of deletion counter of the channel with a predetermined threshold (#8). Hereupon, the predetermined threshold is a positive integer larger than one that is used to decide whether the channel information is deleted from the channel map information or not when the broadcast signal of the channel has not been received in succession. In this embodiment, the threshold is set to be three. When the value of deletion counter reaches to the threshold, the channel information of the channel is deleted from the channel map information (#9). In step 10, the above mentioned steps #7 to #9 are repeated with respect to all of the obtained channels (NO in step #6). When the above mentioned processes are performed with respect to all of the channels registered in the channel map information (YES in step #10), the updating process of the channel map information is completed.

Figure 3:
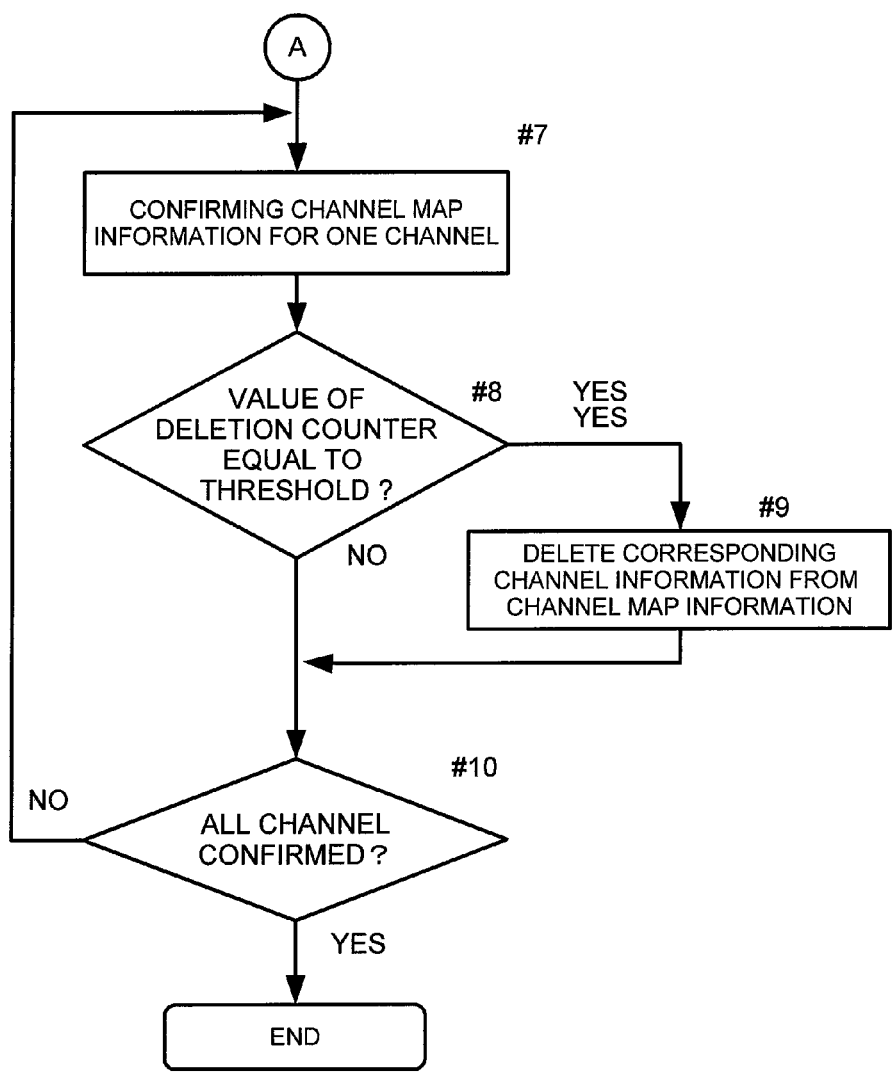
FIG. 3 is a flowchart showing continuance of the processes performed by the channel map creature in update of channel map information.
Figure 4A:
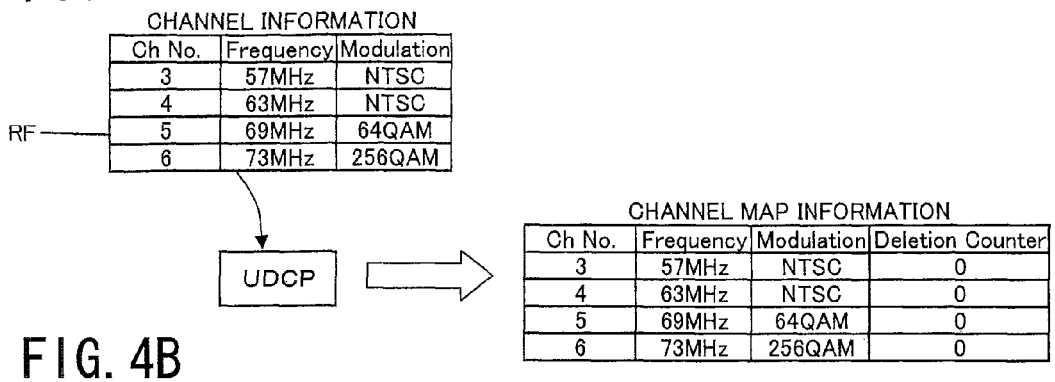
FIGS. 4A to 4C are diagrams respectively showing a part of the channel map information stored in a memory and traces of variation of values in counters for deletion.
Figure 4B:
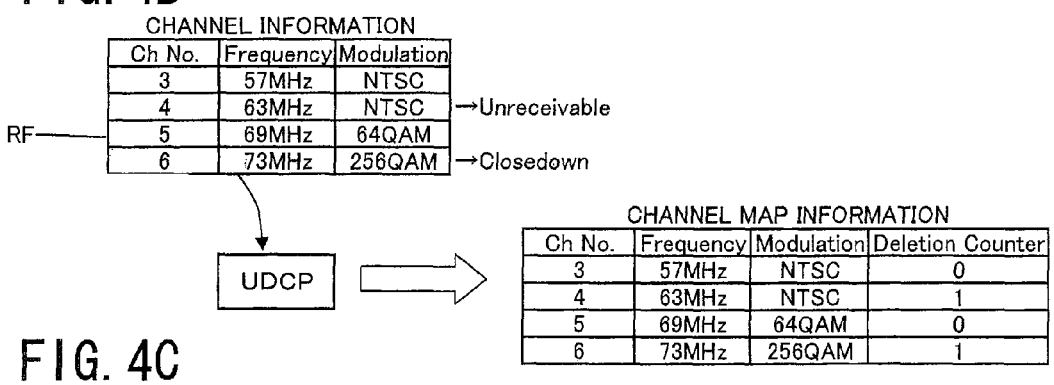
Figure 4C:
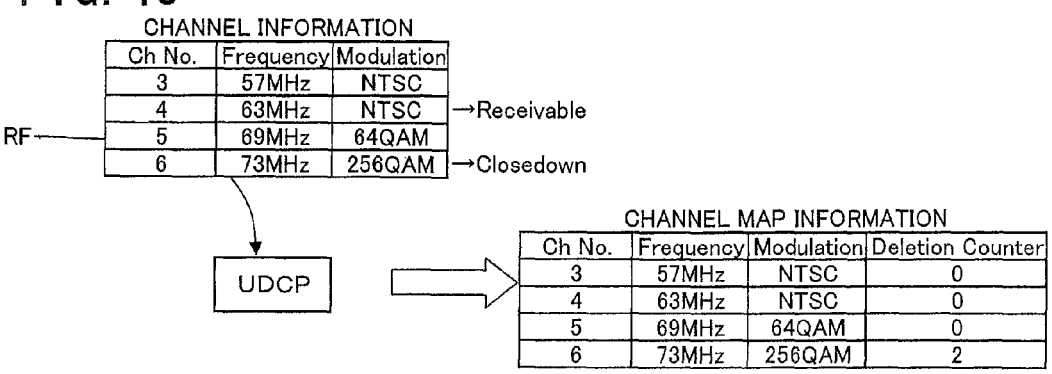

FIGS. 4A to 4C respectively show examples of the channel map information. The channel map information is configured by channel numbers, frequencies, modulation systems, values of counters for deletion, and so on. The channel numbers, frequencies and the modulation systems can be displayed on a screen of the monitor display apparatus. As shown in FIG. 4A, channel information of the channels 3 to 6 are initially registered in the channel map information. Subsequently, the values of counters for deletion of these channels 3 to 6 are increased by one in update process of the channel map information (step #1 in the flowchart shown in FIG. 3).

As shown in FIG. 4B, it is assumed that the broadcast signal of channel 4 cannot be received for any reason such as noise and broadcasting of channel 6 has been completed, the primary controller 8 serving as the channel map updater resets the values of counters for deletion of the channels 3 and 5 to "0" following to the step #4 in the flowchart shown in FIG. 3. On the other hand, since the values of counters for deletion of the channels 4 and 6 are not reset in the processes from the step #2 to the step #6 in the flowchart shown in FIG. 3, the values of the counters of the channels 4 and 6 remain "1".

In next time of update the channel map information, the values of counters for deletion of these channels 3 to 6 are increased by one (step #1 in the flowchart shown in FIG. 3). That is, the values of the counters of the channels 3 and 5 become "1" and the values of the counters of the channels 4 and 6 become "2", once. If the broadcast signal of the channel 4 is receivable because the reason ob unreceivable is solved, the value of deletion counter of the channel 4 is reset to be "0" with the values of counters of the channels 3 and 5, as shown in FIG. 4C. On the other hand, the value of deletion counter of the channel 6 is not reset, the value of deletion counter of the channel 6 remains as "2". When the update process is further performed, the value of deletion counter of the channel 6 reaches to the threshold value "3", for example, and the channel information of the channel 6 will be deleted from the channel map information stored in the memory 9.

As mentioned above, according to the broadcast signal receiving apparatus 1 of this embodiment, when the primary controller 8 serving as the channel map updater performs updating of the channel map information, the channel information of the channel that the value of deletion counter reaches to the predetermined threshold is deleted from the channel map information stored in the memory 9. Thus, when the channel map information is displayed on the screen of the monitor display apparatus, the channel information of the channel which is not delivered may not be displayed. In other words, the user can obtain only the channel information of receivable channels, so that channel selection can be performed smoothly without bothersome of unusable or unnecessary information, and thus, usability of the broadcast signal receiving apparatus 1 can be increased.

In addition, even though the primary controller 8 serving as the channel map updater increases all the values of counters of channels registered in the channel map information by one, it resets the values of counters for deletion of receivable channels. Therefore, the value of deletion counter of only the unreceivable channel is increased whenever the updating of the channel map information. In other words, the channel information of receivable channel may not be deleted from the channel map information.

Furthermore, when a value of the threshold which is to be compared with the value of deletion counter of each channel is selected to be a positive integer more than one, it is necessary to perform the updating processes of the channel map information at least twice. Therefore, it is possible to prevent that the channel information of a channel broadcast signal of which cannot be received temporarily for any reason is erroneously deleted from the channel map information.

Still furthermore, when a channel not registered in the channel map information becomes receivable, the primary controller 8 serving as the channel map updater registers channel information of the newly receivable channel into the channel map information in the updating of the channel map information. Thus, the user can be selected the newly receivable channel with reference to the updated channel map information just after the updating of the channel map information. In addition, the initial value of deletion counter of the newly receivable channel is set to be "0", it is possible to prevent that the channel information of the newly receivable channel is erroneously deleted from the channel map information even if the broadcast signal of the channel cannot be received temporarily for any reason such as noise.

The present invention is not limited to the above mentioned configuration of the embodiment, and it is sufficient to be configured that a channel having a value of deletion counter is equal to or larger than a threshold when the primary controller 8 serving as the channel map information updater performs updating of the channel map information. In addition, the present invention can be modified in various manners. Although the broadcast signal receiving apparatus 1 corresponds to cable cast in the above mentioned embodiment, the present invention can be applied to terrestrial digital broadcasting, satellite digital broadcasting, and so on.

This application is based on Japanese patent application 2007-155427 filed Jun. 12, 2007 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A broadcast signal receiving apparatus comprising:
   a video and audio signal receiver that receives video signals and audio signals included in broadcast signal;
   a control signal receiver that receives broadcast control signal included in the broadcast signal;
   a control signal processor that processes the broadcast control signal;
   a channel map information creature that creates channel map information including information of channels, broadcast signals of which are receivable based on signals processed by the control signal processor;
   a memory that stores the channel map information; and
   a channel map information updater that updates the channel map information regularly, wherein
   the channel map information includes a deletion counter for each channel registered in the channel map information which is used to judge whether channel information of the channel is deleted from the channel map information or not;
   the channel map information updater increases a value of deletion counter of a channel by one when broadcast signal of the channel cannot be received, and resets a value of deletion counter of a channel when broadcast signal of the channel can be received in each updating of the channel map information;
   the channel map information updater deletes channel information of a channel from the channel map information when the value of deletion counter of the channel reaches to a threshold;
   the channel map information updater increases all the values of deletion counters for all channels registered in the channel map information initially by one when the updating of the channel map information starts;
   the control signal receiver tries to receive broadcast signal of each channel sequentially changing tuning frequency of channel;
   the channel map information updater judges whether broadcast signal of each channel is receivable or not based on the control signal included in the broadcast signal of each channel; and
   when the channel map information updater judges that broadcast signal of a channel is receivable, the channel map information updater resets the value of deletion counter of the channel.

2. The broadcast signal receiving apparatus in accordance with claim 1, wherein
   when a channel that broadcast signal thereof is receivable is not registered in the channel map information, the channel map information updater registers channel information of the channel into the channel map information so that a value of deletion counter of the channel is set to be "0".

3. The broadcast signal receiving apparatus in accordance with claim 1, wherein
   the control signal processor is a card shaped signal processing device and loaned to a used by a cable television provider who contracts with the provider, which is inserted into a slot provided on a main frame of the broadcast signal receiving apparatus.

4. The broadcast signal receiving apparatus in accordance with claim 1, wherein
   an on-screen displayer is further provided to display the channel map information by deleting non-receivable channels on a screen of a monitor display apparatus, when a user desires.

* * * * *